Dec. 8, 1959 A. MALAQUIN 2,916,280
TORSIONAL VIBRATION DAMPER
Filed March 5, 1954
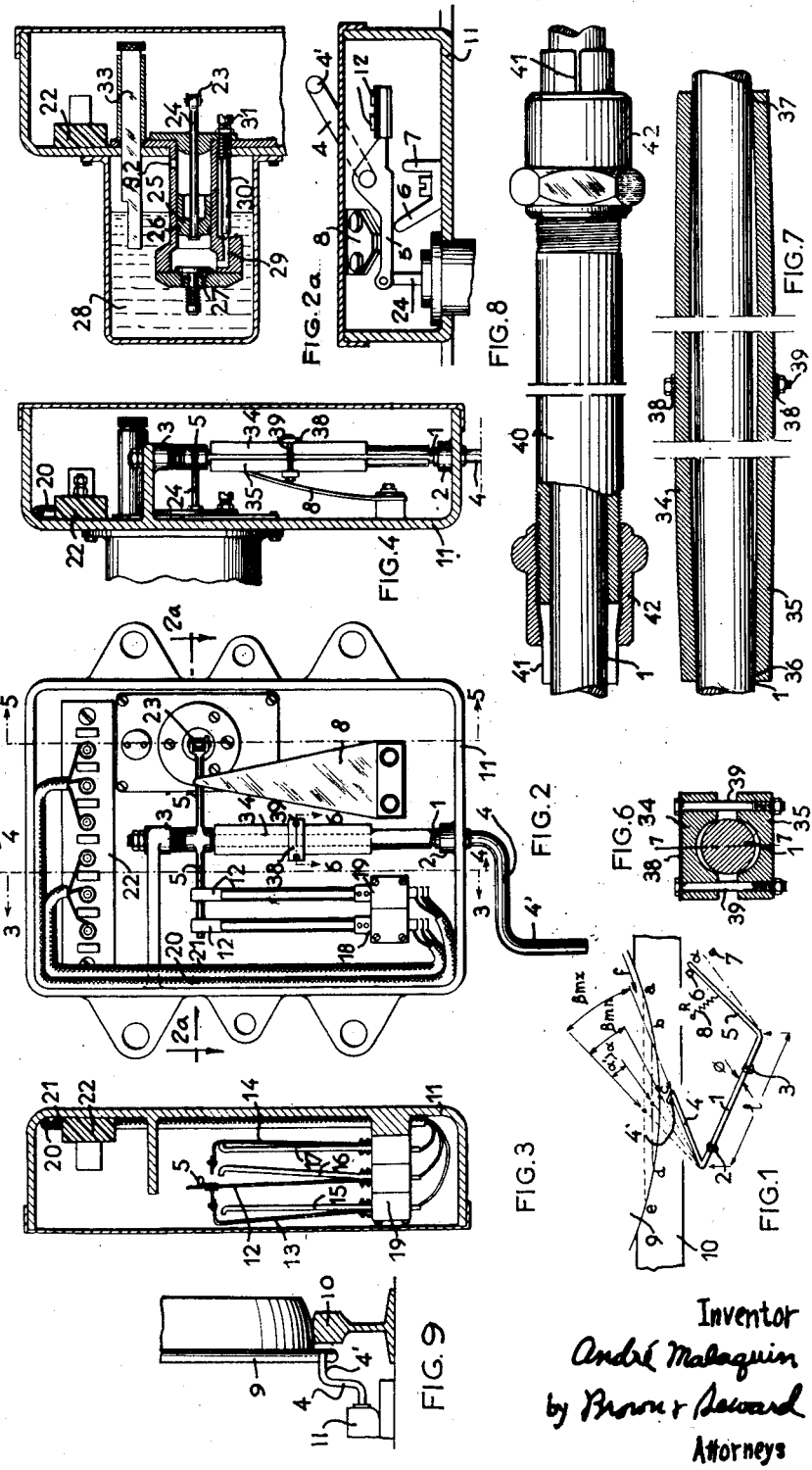
Inventor
André Malaquin
by Brown & Seward
Attorneys

United States Patent Office 2,916,280
Patented Dec. 8, 1959

2,916,280

TORSIONAL VIBRATION DAMPER

André Malaquin, Neuilly-sur-Seine, France, assignor to Society called: Societe Industrielle de Liaisons Electriques (S.I.L.E.C.), Paris, France, a French company Application March 5, 1954, Serial No. 414,444

5 Claims. (Cl. 267—1)

This invention relates to a torsional vibration damper particularly adapted for use in railway signal control boxes of the type in which a pedal angularly displaced under the action of a railway vehicle wheel operates an electric-contact mechanism to establish or break one or more electric contacts controlling, in turn, one or more signal circuits.

In such control boxes, the pedal is subjected at each operation to huge stresses which may be considered as instantaneous shocks, so that most of the existing control boxes have been found insufficiently resistant to assume their functions and have given rise, with time, to breaks or, at least, to perturbations. With increasing speed of trains, the conditions are still more critical.

An object of the invention is to provide a control box of this type, in which the pedal is interconnected with the electric contact mechanism controlling structure, which will be further designated for the sake of clearness by "controlling arm," through a torsionally elastic shaft, so that the actuation of said controlling arm takes place through the elastic transmission constituted by said shaft, the same being so designed that, in any condition of operation, its torsion never exceeds its limit of elasticity, whereby said control box is capable of resisting the operating shocks during a practically endless time of duty.

On the other hand, in such an apparatus, the angular stroke of the pedal is not always the same since it is determined by the diameter of the active portion of the controlling wheel, the speed of said wheel, and, of course, also by its relative position with respect to the rail. Now, the diameters of the wheels of the railway vehicles by which the control box will be actuated are eminently variable, not only according to the type of vehicle, but also as a function of wear.

This is the reason why most of the existing control boxes give rise from time to time to failures. It is nearly superfluous to point out the seriousness of such failures since these devices are provided to ensure the safety of railway traffic.

Another object of the invention is to provide a control box of the type described capable of ensuring absolute safety of operation, whatever may be the diameter and speed of the vehicle wheel which will actuate the pedal.

For this purpose, it is a more particular object of the invention to give to the angular stroke of the controlling arm a magnitude at least slightly lower than that of the minimum angular stroke of the pedal, said minimum stroke being easily calculated for each particular application and for a given relative position between the control box and the rail imposed by the conditions of use, by consulting the statistic list of the railway material in service on the relevant line. The difference between both strokes must be at least equal to the angular relative deformation of the shaft under the action of its elastic return means.

It will be easily understood that, in these conditions, the angular stroke of the pedal will more or less exceed that of the controlling arm according to the diameter and speed of the actuating wheel, so that, if the maximum torsion of the shaft is to be maintained under its limit of elasticity according to the first object of the invention, it is obvious that said shaft must be so designed that said limit of elasticity is sufficiently high to permit said maximum torsion. This limit of elasticity only depends on three factors, to wit, the diameter of the shaft, the modulus of elasticity inherent in the material it is made of and the distance on the shaft between the pedal and the controlling arm.

A more particular object of the invention is therefore to provide a control box of the type described, in which the diameter and modulus of elasticity of the torsion shaft and the active length of the same are so chosen and so related that its limit angle of elastic torsion is greater than the maximum possible relative angular displacement between the pedal and the controlling arm.

Furthermore, since in the control box according to the invention the controlling arm is displaced with a certain delay after the pedal has effected its operating stroke, it is obvious that it is indispensable that said pedal be maintained in its actuated position for a time sufficient to permit said controlling arm to completely travel its own stroke. In other words, if the pedal is released too soon, it will begin to return towards its resting position before the electric contact mechanism has been actuated by the controlling arm and this will result in a failure. Now, the minimum time of actuation of the pedal, i.e. the time between the instant at which it has been depressed to an angular position corresponding to the angular stroke of the controlling arm and the instant at which it is released above said position, may be statistically determined by noting the maximum possible speed of the railway vehicles on the relevant line, as well as the already mentioned minimum diameter of their wheels.

Another object of the invention is therefore to design the above-mentioned torsional shaft in such a manner that the electric contact mechanism controlling arm will be able to effect its whole stroke in a time shorter than said minimum time of actuation of the pedal. The duration of the angular stroke of the controlling arm under the elastic action of the shaft previously torsionally deformed by the pedal is a function of five variables including: the three above-mentioned factors, the total inertia of the electric contact mechanism to be moved and the strength of the return elastic means provided to reset the pedal into resting position.

A further object of the invention is therefore to provide a control box of the type described in which the values of said five variables are so chosen and related as to ensure the desired time relation between the angular strokes of the controlling arm and pedal, respectively.

Due to the very fact that the shaft ensuring the transmission between the pedal and the controlling arm is inherently flexible in torsion, it will be easily understood that it is responsive as well to torsional parasitic vibrations which are particularly important in the field of application of the control box according to the invention where the immediate vicinity of the rail is a natural source of such vibrations and this, in particular, just before a train or other vehicle is to pass over the pedal, i.e. precisely when such vibrations are extremely objectionable and may reach a considerable amplitude, as when resonance effects take place between the vibrations and the natural frequency of the torsional shaft.

One of the most serious influences of these parasitic vibrations is to continuously vary the resting position of the pedal at the very moment when it is to be actuated, said variations magnifying, in one direction, the value of the actuating impact, while, in the other direction, they may even produce unexpected operation of the electric contacts.

Another object of the invention is to provide in a control box such as described above, a damping device capable of suppressing, or at least reducing to a minimum, such objectionable effects of parasitic torsional vibrations of the shaft.

More particularly, it is an object of the invention to provide such a torsional vibration damping device, the operation of which is based on a frictional resistance opposed to the torsional deformations of the shaft, i.e. to relative angular displacements between two axially spaced cross-sections of said shaft.

Another object of the invention is to provide a vibration damping device for the purpose described, which is constituted by a free elongated member considerably more rigid against torsion than the shaft, surrounding the same along a substantial length and clamped thereon at least at its both ends.

Now, for reasons inherently concerned with electrical characteristics, to ensure a safe operation of the electric circuits by a control box according to the invention, it does not suffice to provide a safe establishment of electric contacts, but also to maintain said contact established for a substantial time.

Another object of the invention is therefore to design the electric-contact mechanism of a control box according to the invention in such a manner that the required contacts are established during a substantial portion of the angular stroke of the controlling arm and to incorporate in said box a dash-pot adapted to be armed upon completion of said angular stroke and capable of "spreading" in time the return period of the arm.

Finally, it is known that railway track control boxes are subjected to very hard conditions of duty. In particular, it is of the utmost importance that their safety of operation be not impaired by wide variations of temperature.

Another object of my invention is to provide, in the above-described dash-pot, a needle valve made of a material having a higher coefficient of thermic expansion than the material of which said dash-pot is made, so as to automatically vary a cross-section of passage of the fluid of the dash-pot in response to temperature variations, to thereby compensate the corresponding variations of the degree of viscosity of said liquid.

Other objects and advantages of the invention will be apparent from the following detailed description, together with the accompanying drawings, submitted for purposes of illustration only and not intended to define the scope of the invention, reference being had for that purpose to the subjoined claims.

In these drawings:

Fig. 1 is a diagrammatic view illustrating the principle of operation of the control box according to the invention.

Fig. 2 is a top view of a control box with its cover removed.

Fig. 2a is a detailed section on the line 2a—2a of Fig. 2.

Figs. 3, 4 and 5 are sectional views respectively along lines 3—3, 4—4 and 5—5 of Fig. 2.

Fig. 6 is a cross-sectional enlarged view along line 6—6 of Fig. 2 of the torsional vibration damper according to the invention.

Fig. 7 is a longitudinal partly sectional view along line 7—7 of Fig. 6.

Fig. 8 is a longitudinal elevational view of an alternative embodiment of the damping device with parts broken away.

Fig. 9 is a detail vertical section across a railway rail, showing in elevation a vehicle wheel rim acting on the pedal of the control box, parts being broken away.

As shown in Fig. 1, the torsionally elastic shaft 1 of the control box according to the invention is rotated in bearings 2 and 3 provided in said box and is rigidly connected at its outer end with a crank-arm or pedal 4 and is keyed or integral with a controlling arm 5 at a point axially spaced from pedal 4.

It is obvious that, under "controlling arm," there is meant any controlling member or structure which may be constituted in fact by several arms, as will be shown e.g. with reference to Fig. 2, this simple shape of "one controlling arm" being adopted in the description as well as in the appended claims to make the operation more easily understood.

For the same purposes of simplification, it has been assumed in Fig. 1 that the controlling arm 5 is keyed at the end of shaft 1 opposed to crank-arm 4, while it is obvious that it may be keyed as well at any point of the length of shaft 1, provided this point is axially spaced from crank-arm 4.

As shown in Fig. 1, the controlling arm 5 of the control box according to the invention is displaceable between a resting position precisely defined by an abutment 6 and a maximum actuated position also defined, if desired, by another abutment 7. The useful angular stroke of the controlling arm 5, i.e. its angular stroke required to actuate the electric contacts of the control box is designated hereunder and in Fig. 1 by $\alpha$. As shown, this useful stroke may be lower than the total stroke of the controlling arm between both abutments 6 and 7. Return spring means 8 continuously urges the controlling arm 5 towards its resting abutment 6.

In Fig. 1, a vehicle wheel 9 is diagrammatically indicated on a rail 10 in a position in which the pedal 4 is at least depressed to the position shown in double dot-dash line (for example, if wheel 9 is stationary) and at most depressed to the position shown in full line (under the impact of wheel 9 if the same is rolling at a high speed). The arrow $f$ indicates the direction of rotation of the wheel 9, corresponding to movement of the wheel from left to right of said figure.

For the sake of simplification, it has been assumed that the arm 4' of the pedal is continuously normal to the plane of rotation of wheel 9. The resting position of pedal 4 corresponding to the resing position of arm 5 has been shown in dotted line, while the position shown in dot-dash line corresponds to an angular stroke $\alpha'$ of the pedal greater than the useful angular stroke $\alpha$ of arm 5, $\alpha'$ being the angle by which the pedal must be rotated to cause rotation of arm 5, the difference $\alpha'-\alpha$ corresponding to the rotation imparted to arm 5 towards its resting position by the elastic means 8 when pedal 4 is in said dot-dash line position.

Point $a$ is the point of impact of wheel 9 (of course, in this description, the term "wheel" means in fact the active portion, e.g. the flange of the vehicle wheel) on the pedal.

Let us consider the motion of pedal 4 after said impact. It will be first assumed that the speed of wheel 9 is so slow that pedal 4 remains in contact with the periphery of said wheel during its whole passage on the pedal. In these conditions, the level of the point of contact between wheel 9 and the pedal 4 is first lowered from $a$ to $b$ at which the pedal is depressed by angle $\alpha'$ (position in dot-dash line). From this instant, one is sure that if pedal 4 is maintained in this depressed condition a sufficiently long time, the controlling arm 5 will effect at least its active stroke $\alpha$. The level of the point of contact is further lowered from $b$ to $c$, whereupon it begins to be lifted again from $c$ to $e$ through $d$, $d$ being the same level as $b$, while $e$ is on same level as $a$. At this point $c$, the pedal is depressed by an angle $\beta$ min. The value of said minimum angle is easily determined. It corresponds to the minimum diameter of the vehicle wheels used on the relevant line.

Similarly, it will be easily understood that the minimum time $\tau$ during which the pedal remains depressed at least by angle $\alpha'$ is a function of the speed of wheel 9 and its diameter so that it may be easily predetermined.

According to the invention, the time $\tau$ must be sufficient to permit arm 5, effecting angular stroke $\alpha$ against the action of the elastic means 8 and against the inertia of the parts to be moved by said arm. Moreover, the arm 5 must effect its stroke under the elastic action of shaft 1 previously deformed in torsion by pedal 4. In other words, the torsional properties of shaft 1 must permit pedal 4 to effect its whole stroke while arm 5 is still in its resting position against abutment 6, whereupon pedal 4 being maintained depressed at least by an angle $\alpha'$ during a minimum time as explained above, arm 5 will be rotated in turn by angle $\alpha$ under the elastic action of shaft 1 tending to reassume its original shape. In these conditions, if the angular stroke $\alpha$ of arm 5 is to be completed, it is obviously necessary that the elasticity of shaft 1 be capable of ensuring said stroke against the action of spring 8 and the inertia of the parts to be moved in a time $\theta$ at most equal to the above-defined time $\tau$ of actuation of the pedal. Now, said time $\theta$ is a well-defined and known function $(f)$ of the following factors: magnitude of the momentum of inertia I of the assembly comprising arm 5 and the parts to be moved with respect to the axis of shaft 1, the strength R of the returning elastic means 8, the diameter $\phi$, the length $l$ and the modulus of elasticity E of shaft 1:

The equation of the system is thus:

$$\theta = f(I, R, \phi, l, E) \leq \tau$$

I is predetermined by the dimensions of the contact controlling elements as well as those of the dash-pot which are, in turn, determined by the timing required to obtain a safe completion of an electric circuit and by the conditions of exploitation imposed in the signal system. The minimum value of R is defined by the practical conditions of duty: snow, extraneous body capable of actuating the pedal, so that, finally, the equation may be re-written:

$$f(\phi, l, E) \leq \tau$$

Now, in fact, the pedal 4 is nearly always depressed to a level lower than that of point $c$, due to the fact that it is actuated by the violent impact of the wheel, so that it leaves its contact with the same. The maximum value of the angle of depression of the pedal 4 or $\beta_{max}$ may be calculated as a function of the maximum speed and the minimum diameter of the vehicle wheels.

The control box according to the invention is so designed that this maximum torsion $\beta_{max}$ of shaft 1 is not capable of causing a permanent deformation of said shaft and, hence, deterioration of the control box. The equation corresponding to this condition is:

$$\beta_{max} \leq f(l, \phi, T)$$

T being the elastic limit of torsion of the shaft.

In a specific embodiment, it has been found that the following values of the above-indicated factors permit designating a control box capable of ensuring a safe operation during a practically endless life.

$\phi = 7$ mm. $\pm \frac{1}{100}$.
$l = 172.5$ mm.
Quality of the steel of shaft 1 = 18% Ni, 8% Cr.
Timing of the contacts = 5 to 20 seconds for a minimum depression of the pedal by 12 mm.
Maximum speed of the train = 180 km./hour.
Minimum diameter of the vehicle wheels = 80 cm.
R, strength of the return elastic means, is such that a stress of 1.25 kg. does not cause any displacement of the pedal.

In the constructive embodiment shown in Figs. 2 to 5, the control box 11 contains, in addition to the torsion shaft 1 which is designed and operates as described with reference to Fig. 1, a strong triangular leaf spring 8 which constitutes the already mentioned return-elastic means and the free end of which bears on a lever 5' keyed on shaft 1 together with the controlling arm 5 proper. The latter lifts, at rest, by its free end a spring movable contact 12 which, in the example shown, is disposed between two fixed spring contacts 13 and 14, respectively, cooperating with more rigid abutment bars 15, 16 and 17. As clearly shown in Fig. 3, according to another feature of the invention, the control of the contacts thus takes place by a release of the spring leaf 12, due to the depression of the controlling arm 5. Thus, the actuation of the contacts introduces no additional stress to be overcome by the torsion shaft. In the position shown in Fig. 3, which corresponds to the resting position of pedal 4, contact 12—13 is established while contact 12—14 is broken. When pedal 4 is actuated, the spring leaf 13 is no more compressed and comes into abutment with bar 15, so that contact 12—13 is interrupted. Leaf 12 establishes contact 12—14 and spring leaf 14 is compressed, in turn, until leaf 12 abuts on bar 16. In the example shown, two sets of contacts are provided, as shown at 18 and 19, respectively, in Fig. 2. Two three-conductor cables 20 and 21 respectively interconnect with the sets of contacts 18 and 19, each with three terminals mounted on suitable support, as shown at 22.

The lever 5' of the controlling arm is articulated with a suitable clearance as shown at 23 on the outer end of the rod 24 (see Fig. 5) of the piston 25 of a dash-pot, the cylinder 26 of which communicates at its inner end with an oil container 28, on the one hand, under the control of a suction valve 27 and, on the other hand, through a narrow duct 29, the cross-section of which may be varied by means of needle valve 30, the position of which can be adjusted by more or less screwing its threaded portion 31. Finally, a hole 32 communicates the outer end of the dash-pot cylinder 26 with atmosphere to permit motion of its piston 25. The function of the dash-pot which has been just described is to brake the return stroke of pedal 4 from its depressed position after it has been actuated by a vehicle wheel, as described above, the main purpose of this arrangement being to maintain the contact 14—17 in break condition and the contacts 12—16 and 13—15 in make condition during a time sufficient to establish the required electrical conditions in the relevant circuits. Incidentally, this braking action of the dash-pot 26 also has the advantage of avoiding an unwanted succession of shocks on the pedal due to the passage of the vehicle wheels of a train, for example, after the actuation of said pedal by the first one of said wheels.

According to a particular feature of the invention, the needle valve 30 of the dash-pot is made of a material having a higher coefficient of thermal expansion than the material the cylinder 26 is made of. Due to this arrangement, the variations of the external temperature which have the drawback of causing a variation of the degree of viscosity of the oil in the container 28 also cause a variation of the cross-section of duct 29, so that if the two different materials are suitably chosen and the dimensioning is suitably calculated, it is possible to accurately compensate said unwanted variation of viscosity, so that the timing of the dash-pot no longer depends on the external temperature. This feature is particularly important in winter when, as well known, a great many faulty operations have been observed with the known control boxes. In Fig. 5, an oil level gauge 33 has been indicated.

The operation of the dash-pot is extremely simple; when lever 5' is lifted, due to depression of pedal 4, piston 25 sucks oil from container 28 into cylinder 26 under automatic opening of the suction valve 27 without material resistance due to the large total cross-section of the inlet passages. When pedal 4 has been fully depressed and begins to be returned towards its resting position, under the action of spring 8, piston 25 slowly expels the oil through the narrow cross-section of duct 29.

According to another feature of the invention, the torsion shaft 1 is preferably provided with a torsional vibration damper in order to rapidly absorb the parasitic vibrations e.g. due to the incoming train which is to actuate the pedal.

In the example shown in Figs. 6 and 7, said vibration damper is merely constituted by two substantially semi-cylindrical shells 34 and 35 clamped at both ends around shaft 1, as indicated at 36, 37, respectively, under the action of clips 38, and draw-bolts 39. In the alternative embodiment shown in Fig. 8, the torsional vibration damper is constituted by a tubular member 40 both ends of which are provided with longitudinal slots 41, said ends being externally threaded and clamped on shaft 1 by means of nuts 42.

In both embodiments, the clamping of two axially spaced cross-sections of shaft 1 by an elongated element, which is materially more rigid against torsion than said shaft, gives rise to frictions between said element and said shaft and said frictions rapidly absorb the objectionable torsional vibrations which tend to impart to said axially spaced cross-sections of shaft 1 relative angular displacements.

What is claimed is:

1. In combination with a shaft subject to torsional vibration, a torsional vibration damper therefor comprising a torsionally elastic elongated tubular body having means for causing frictional engagement between inner surface portions of said body adjacent its ends and the complementary surface portions of said shaft at more than one point, said body having a length between said inner surface portions shorter than the length of the shaft, said body having a greater torsional resistance than said shaft and said body having an inner diameter intermediate said inner surface portions larger than the diameter of the shaft intermediate said inner surface portions.

2. In combination with a shaft subject to torsional vibration, a torsional vibration damper therefor comprising a torsionally elastic tubular body having a length shorter than the length of said shaft and disposed concentrically therewith, means for causing each end of the tubular body to frictionally engage said shaft at more than one point at each end thereof, said body having a greater torsional resistance than said shaft, and the inner diameter of said body intermediate the ends thereof being larger than the diameter of the portion of the shaft which is intermediate the ends of said body.

3. A damper according to claim 2 in which the tubular body is constituted by two parts divided longitudinally, the diameter of the bore being greatest midway between the ends of said body and tapering from the midway point toward each end, and in which the means for causing each end of the body to engage the shaft comprises means positioned on said body adjacent the midway point thereof for clamping the body parts together.

4. A damper according to claim 2 in which the tubular body is externally threaded adjacent its ends, and in which the means for causing each end of the body to engage the shaft comprises a nut on each end of said body, each said nut having a tapered portion disposed to effect engagement between the tubular body and the shaft.

5. A damper according to claim 2 in which the shaft is provided with an unbalanced radially projecting load adjacent one end and with means adjacent its other end for resisting rotation of the shaft about its axis and in which the torsional vibration damper is mounted on said shaft intermediate said ends.

References Cited in the file of this patent

UNITED STATES PATENTS

| | | |
|---|---|---|
| 368,764 | Hammer | Aug. 23, 1887 |
| 445,564 | Loy et al. | Feb. 3, 1891 |
| 486,569 | Ross | Nov. 22, 1892 |
| 901,422 | Cook | Oct. 20, 1908 |
| 1,615,186 | Bossert et al. | Jan. 18, 1927 |
| 1,668,267 | Colas | May 1, 1928 |
| 1,671,659 | Varney | May 29, 1928 |
| 1,686,381 | Jenny | Oct. 2, 1928 |

FOREIGN PATENTS

| | | |
|---|---|---|
| 125,182 | Australia | Aug. 12, 1947 |
| 687,337 | France | Apr. 28, 1930 |
| 854,175 | France | Jan. 4, 1940 |
| 965,407 | France | Feb. 15, 1950 |
| 22,710 of 1896 | Great Britain | Oct. 13, 1896 |